(12) United States Patent
Jetter

(10) Patent No.: US 7,295,948 B2
(45) Date of Patent: Nov. 13, 2007

(54) LASER SYSTEM FOR MARKING TIRES

(76) Inventor: Heinz L. Jetter, Gronewaldstrasse 110, 41836 Hückelhoven (DE)

( * ) Notice: Subject to any disclaimer, the term of this patent is extended or adjusted under 35 U.S.C. 154(b) by 0 days.

(21) Appl. No.: 11/188,613

(22) Filed: Jul. 25, 2005

(65) Prior Publication Data

US 2006/0161381 A1    Jul. 20, 2006

(30) Foreign Application Priority Data

Jan. 15, 2005 (DE) .................. 20 2005 000 640 U
Feb. 11, 2005 (DE) .................. 20 2005 002 355 U

(51) Int. Cl.
*G01B 15/00* (2006.01)
(52) U.S. Cl. .................. 702/155; 73/146; 156/349; 156/272.8; 156/110.1; 156/250; 156/60; 382/104; 382/141; 382/312
(58) Field of Classification Search ................. 702/155; 156/272.8, 524, 525, 116, 250, 268, 270, 156/64; 73/146; 235/385; 382/104, 141, 382/312
See application file for complete search history.

(56) References Cited

U.S. PATENT DOCUMENTS

| | | | | |
|---|---|---|---|---|
| 5,527,407 A | * | 6/1996 | Gartland et al. .............. 156/64 |
| 5,603,796 A | * | 2/1997 | Baker ....................... 156/272.8 |
| 6,539,789 B1 | * | 4/2003 | Kostka et al. ................. 73/146 |
| 2004/0134983 A1 | * | 7/2004 | Oyama et al. .............. 235/385 |
| 2004/0165180 A1 | * | 8/2004 | Voeller et al. ......... 356/139.09 |

FOREIGN PATENT DOCUMENTS

| | | |
|---|---|---|
| DE | 203 10 931.7 | 7/2003 |
| DE | 20 2005 000 640.8 | 1/2005 |
| DE | 20 2005 002 355.8 | 2/2005 |

* cited by examiner

*Primary Examiner*—John Barlow
*Assistant Examiner*—Hien Vo
(74) *Attorney, Agent, or Firm*—Luis M. Ortiz; Kermit D. Lopez; Ortiz & Lopez, PLLC

(57) ABSTRACT

System for identifying and marking individual automotive tires including use of a light sheet sensor enabled image processing for the identification of the tire type and the marking spot. The height profile of the raised symbols on the tire sidewall can be measured using the light sheet sensor and matched to a library of reference profiles stored in memory. The light sheet sensor measures the height profile of the tire sidewall for identifying the tire and for selecting the marking spot and where the light sheet sensor and a laser are mounted on a swivel arm. The light sheet sensor can be incorporated into a single- or multi-station system. A marking laser is adapted for engraving markings on a specific spot in rubber on the side of a tire via laser radiation after the type and size of the tire and a marking sport has been identified by image processing.

20 Claims, 5 Drawing Sheets

LASER SYSTEM FOR MARKING TIRES

APPLICATION PRIORITY

Priority is being claimed from German Patent Application 20 2005 000 640.8, filed Jan. 15, 2005 by Jet Laser Systeme Gesellschaft für Oberflächentechnik mbH, entitled "Laser System With Light Sheet Sensor For Marking Of Tires", and also from German Patent Application 20 2005 002 355.8, filed Feb. 16, 2005 by Jet Laser Systeme Gesellschaft für Oberflächentechnik mbH, entitled "Laser System For Tire Marking With High Output." These parent applications are herein incorporated by reference for their teaching.

TECHNICAL FIELD

The present embodiments are generally related to tire marking. More particularly, the embodiments are related to automated tire marking using laser systems and light sheet sensor-enhanced image processing.

BACKGROUND

Automotive tires are safety relevant products. For liability reasons, there is an increasing demand to mark each tire individually in order to trace its production history in case of damages or claims. The markings must be human readable even after extended on-road usage of the tire. Markings consist of a series of alphanumeric symbols and have to be engraved on a well visible spot of the tire sidewall.

In the past, some tire manufacturers have used individual paper barcode labels on tires to control the production process of the tire. Such labels are stuck to the bead of each tire at the first production step and pass with the tire through the whole production chain up to final finishing. In this way, the individual information for each tire is available but not in a human readable fashion and not on a durable label.

German Utility Patent Nr. 203 10 931.7 describes a laser system that attempts to solve this marking task. In this system a conveyer belt transports the tire into a marking station until it stops underneath a horizontal swivel arm. Grip arms center the tire under the rotation axis of the swivel arm. A video camera and a laser are mounted onto the arm. The camera photographs the sidewall of the tire and is supposed to direct the laser to a marking spot after comparing the sidewall captured by the camera with photographs stored in memory. This concept does enable the use of very compact, inexpensive devices for tire marking. But video based picture-processing has revealed severe drawbacks. Video pictures rely on the contrast of colors (black/white). The raised symbols/letters on the tire sidewall are formed as part of the tire molding process. The symbols appear black on black, despite being in the form of raised figures. The human eye is only able to distinguish these black on black symbols because humans can unconsciously look for changes in the gloss on a tire surface. Simple video system processing, like that used in the above-described system, are not as sophisticated as human image processing capabilities and are unable to make such a distinction. Therefore slight changes on a tire's surface roughness or in workstation illumination can lead to malfunctions with prior systems.

SUMMARY

The invention that will be described herein circumvents the drawback experienced with systems employing standard video systems by using image capturing technology that does not rely on color contrasts to evaluate a tire specimen but instead measures the height profile of the raised symbols formed on the sidewalls of tires to evaluate their layout. By comparing the captured image profile with reference profiles, the type of the tire and its rotational position can be identified independently of illumination and tire surface quality.

In accordance with a feature of the embodiments, the present system for marking individually automotive tires by laser uses a light sheet sensor to measure the height profile of a tire's sidewall in identifying the tire and for selecting a marking spot.

In accordance with another feature of the embodiments, the light sheet sensor and a laser can be mounted together on a swivel arm.

In accordance with yet another feature of the embodiments, during operation the system continuously transports a tire through the device on a conveyer belt without slip while the position of the tire on the belt is identified by a sensor and the swivel arm can be adjusted to this position and can move synchronously with the tire.

In accordance with yet another feature of the embodiments, the marking solution can be provided in a single station with the following process steps: positioning the tire, recognizing the type of the tire and determining its rotational position; positioning the laser; engraving and verification.

In accordance with yet another feature of the embodiments, the described tire marking solution can be deployed as a multi-station system. With more than one station, two swivel arms move with the belt, one for a first light sheet sensor and the other for the laser engraver, which are each independently positioned to the centers of two each other's following tires and are adapted to identify and mark two tires at the same time. A second light sheet sensor operates in conjunction with the laser engraving station to verify markings.

In accordance with yet another feature of the embodiments, during operation in a multi station system a tire is continuously transported through the system without slip by a conveyer belt. At a first station a laser scanner detects the center position of the tire on the belt. At a second station the type of the tire and its rotational orientation are determined by light sheet sensor enabled imaging processing, mounted on a horizontal swivel arm. At the third station, a laser engraves the tire marking.

In accordance with yet another feature of the embodiments, the described system has two independent swivel arms, one for station two and one for station three. Therefore two tires can be processed at the same time. During operation, when the swivel arm associated with the third (marking) station is marking tire one, the swivel arm associated with the second (1$^{st}$ imaging) station can synchronously analyze the sidewall of the following tire. A light sheet sensor enabled image processing system co-located with the engraving laser at the marking station can then verify the marking prior to process completion.

DETAILED DESCRIPTION

Figure 1:
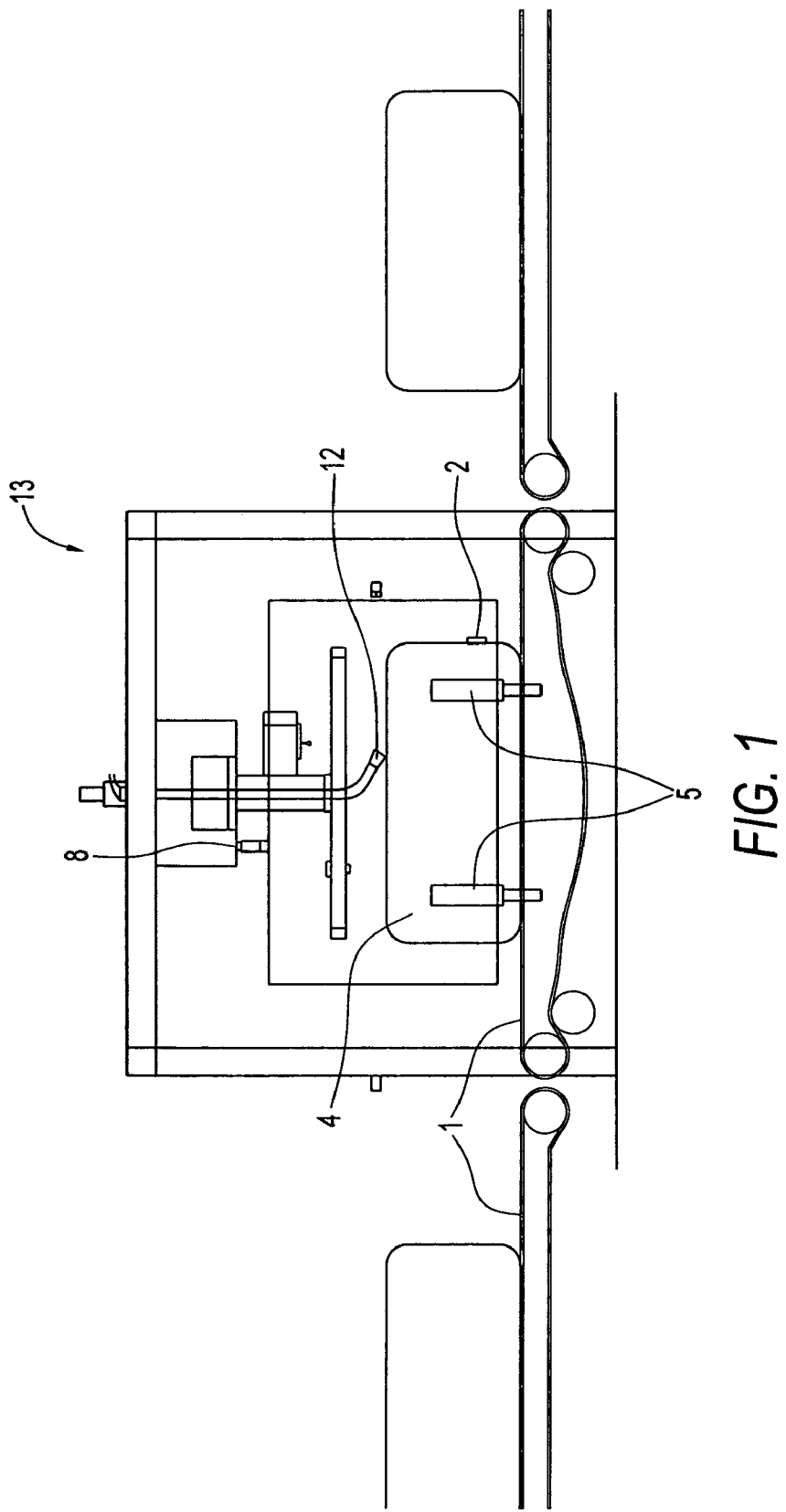
FIG. 1 (prior art) illustrates a side view of a laser-based tire marking system.
Figure 2:
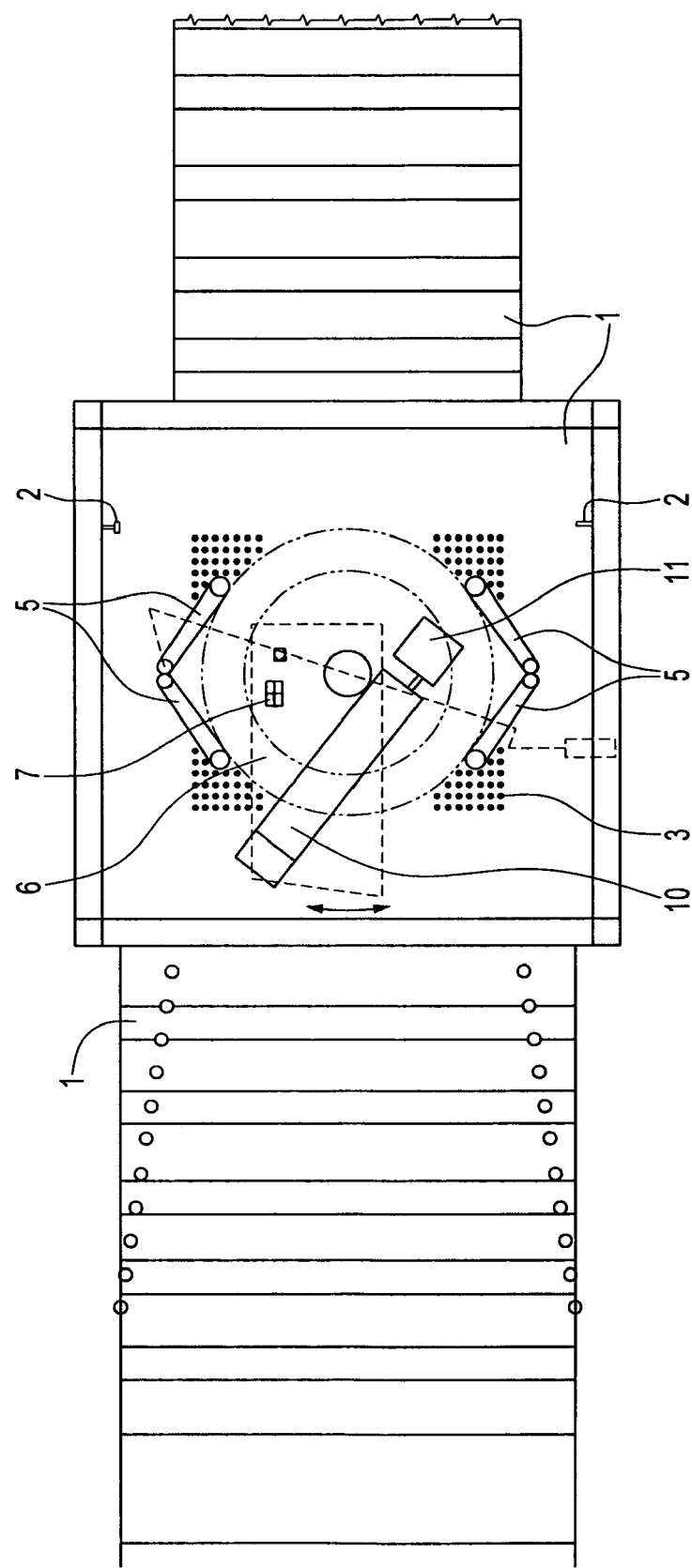
FIG. 2 (prior art) illustrates a top view of a laser-based tire marking system illustrated in FIG. 1.
Figure 3:
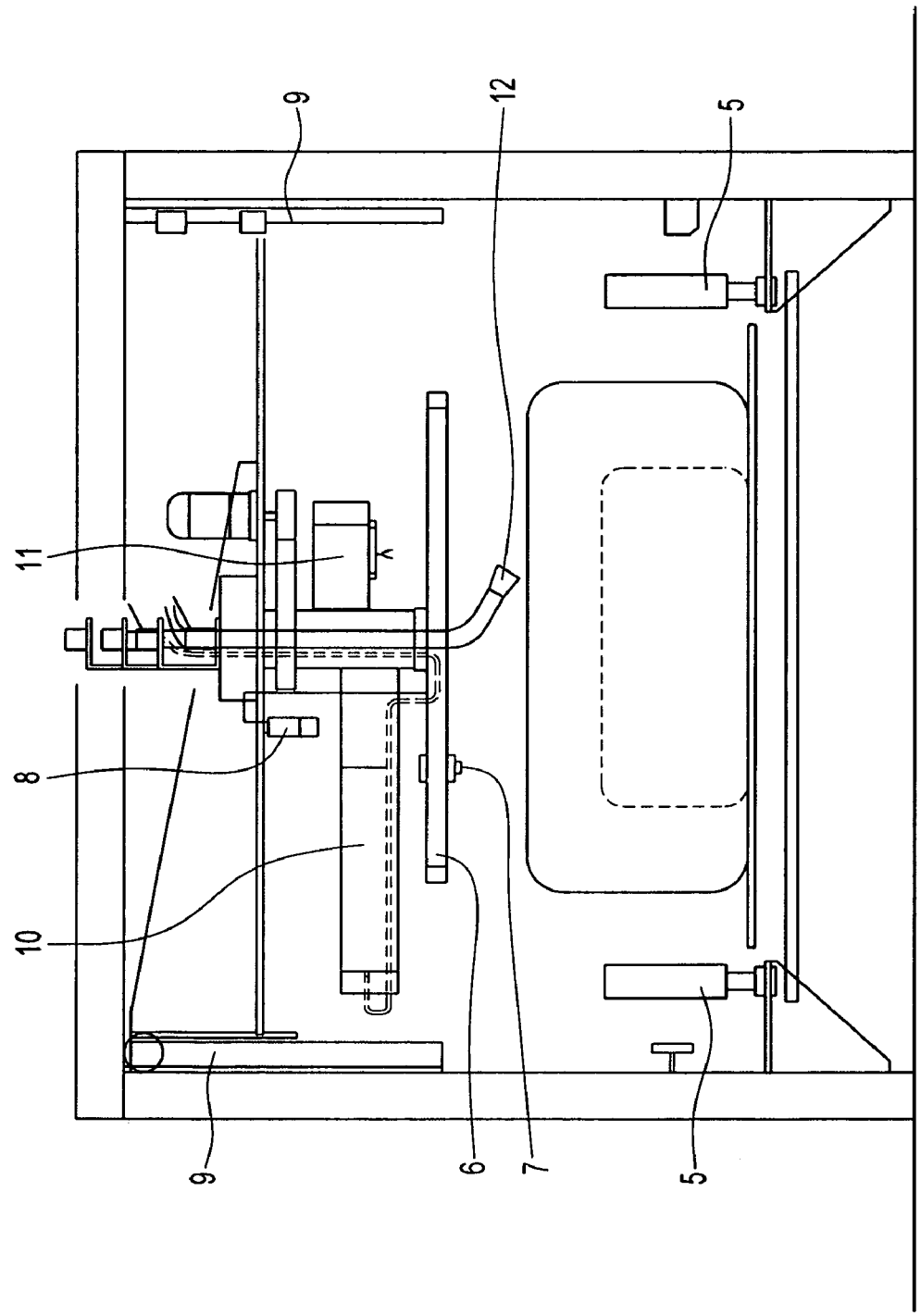
FIG. 3 (prior art) illustrates a close-up side view of the laser-based tire marking system illustrated in FIGS. 1 and 2.

Referring to FIGS. 1-3, which are labeled as prior art, it has been attempted with some success to automate laser tire marking. In accordance with the teaching in German Patent Application Nr. 20310931.7, a tire 4 is transported via a conveyer belt 1 to the laser station 13. As soon as the tire reaches the station 13 a light barrier 2 is activated which stops the conveyer belt 1. As shown in FIG. 2, small spherical rollers 3 are integrated into the belt 1. The rollers 3 allow movement of the tire 4 on the belt 1 in each direction with minimum friction. Pairs of pneumatic grip arms 5 are used to mechanically center tires to a given center point independently of their size and original location on the belt 1.

A swivel arm 6 is located above the centered tire. The rotational axis of the swivel arm is collinear with the symmetrical axis of the tire. A barcode reader 7 is mounted on the swivel arm 6. By swinging the swivel arm 6 about one revolution the barcode reader 7 reads the paper label sticking to the tire bead.

While the swivel arm 6 swings back or forth, a camera system 8 is activated. It photographs the sidewall of the tire and compares this picture via pattern recognition software with pictures stored in a controller/computer (not shown). Information from the camera system 8 allows selection of a fitting picture from the library stored in the computer. In order to focus the camera 8 on the sidewall, the vertical distance between the camera 8 and the tire has to be adjusted according to the tire's width. The information on the tire width is available from the controlling computer via the identified barcode. The camera 8 can also be mounted o the swivel arm 6. In order to change the vertical distance, the camera 8 and/or swivel arm 6 is mounted on a motor driven linear rail 9 (enabling Z-axis movement of the camera 8).

In accordance with the prior teachings, a pattern recognition program looks for characteristic templates on the sidewall and allows positioning of a continuous wave C02 marking laser 10 over the registered marking spot relative to information from templates stored in memory. In this way the marking is always found at the same spot of all tires. If image processing is successful, engraving is achieved by the laser 10. Its beam is focused on the tire surface and deflected by a computer controlled galvanometer-scanner 11. In this way symbols, numbers and letters can be engraved in the rubber of the tire within a few seconds. Fumes and dust generated by the laser engraving are evacuated through a nozzle 12. After finishing the engraving the camera 8 is used again to check the marking by comparing its picture with the corresponding computer stored/generated one. Finally the tire 4 is moved out of the laser station by the conveyer belt. The system computer/controller will generate a NOT O.K. signal, if the barcode or sidewall could not be recognized or if the marking is not correct.

Video pictures rely on the contrast of colors (black/white). But symbols on the tire sidewall are molded in the sidewall as part of the tire molding process. Despite being raised figures the symbols appear black on black. The human eye is able to distinguish these black on black figures because it unconsciously looks for changes in the gloss on the tire surface. Simple video systems like those disclosed in the prior art are unable to distinguish changes in gloss on tire surface, which is why the prior art solution is somewhat inferior to that which will now be disclosed.

Slight changes of the tire surface roughness or of the workstation illumination have lead to malfunctions in prior tire marking systems using basic image processing. The present invention traverses this drawback by using an image processing technology that does not rely on color contrast but instead measures the height profile of the raised symbols on the sidewalls. By using light sheet sensor technology during image processing, a comparison of the height profile of symbols on a tire's surface can easily be compared to reference profiles store in a memory. The type of the tire and its rotational position can also be identified, independently of the illumination and the surface quality.

Figure 4:
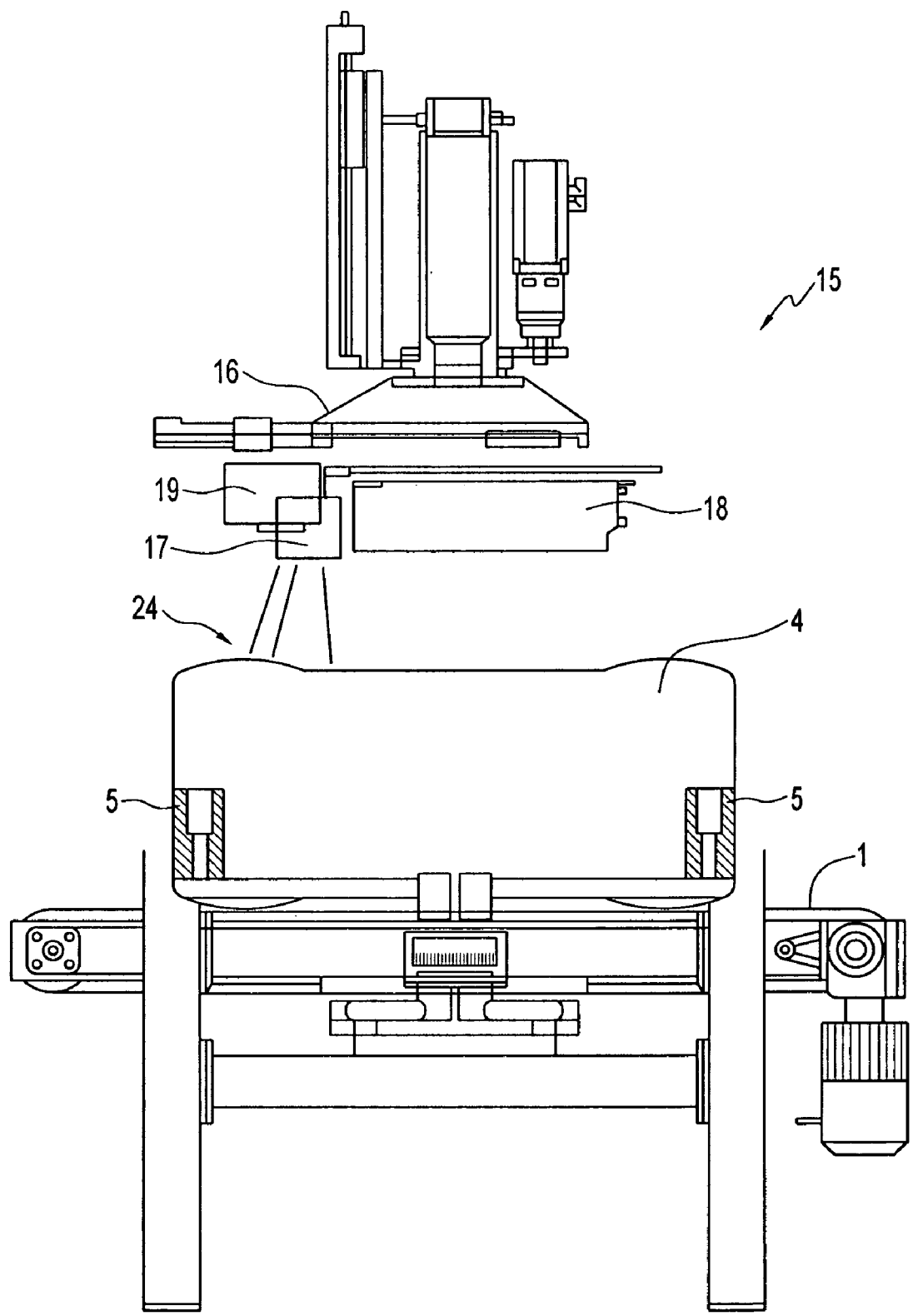
FIG. 4 illustrates a side view of a laser-based tire marking system in accordance with feature of the present invention.

Referring to FIG. 4, a feature of the invention is illustrated. The tire 4 is transported to the laser station by a conveyer belt 1. As soon as the tire 4 reaches the laser station 15 the conveyer belt stops. Grip arms 5 center tires at a fixed position independent of their size. A horizontal swivel arm 16 is located above the tire 4. Its vertical rotational axis is collinear with the symmetry axis of the tire.

Mounted on the swivel arm 16 is an image processing system 17 including a light sheet sensor. The image processing system 17 detects the height profile of the raised symbols on the sidewall 24, by swinging one revolution across the tire 4. The detected height profile of lettering/symbols is compared to the corresponding reference profile stored in a computer library (not shown). By matching the profiles, the correct marking spot is identified. The engraving is achieved by the laser 18, which together with the computer controlled galvanometer scanner 19, can also be mounted on the swivel arm 16.

After completion of the engraving process, the marking is verified by another swing of the (second) arm 16 and with the light sheet detector enabled image processing system 17. The image processing system 17 compares the measured profile of the new markings with corresponding computer stored/generated markings. Finally the tire 4 is moved out of the laser station 15 by the conveyer belt 1. The computer/controller will generate a NOT O.K. signal, if the sidewall could not be recognized or if the marking is not correct.

In this system, like prior technology, the tire is supplied by a conveyer belt 1 and centered at a fixed position by grip arms 5. Above this point, however, is a horizontal swivel arm 16 with an integrated light sheet sensor enabled image processing system 17 and a marking laser 18. A light sheet sensor overcomes the imaging problems encountered by prior system because it can measure the height profile of the raised black on black symbols on the sidewall. This allows categorizing the tire 4, to select the marking spot on the sidewall 24, and to verify the marking independently of the illumination at the workstation 15 and the surface roughness of the tire 4. The described system works extremely reliable and is further distinguishable by its low price and small footprint.

One disadvantage of a single station system is its sequential mode of operation. This means the following steps are processed one after another: conveying of the tire; centering below the swivel arm scanning the sidewall; selecting the marking spot; laser engraving; verifying the marking. The resulting cycle time is about 15 seconds, which means four tires can be processed in one minute, correspondingly about 6,000 tires per day. Modern tire plants are producing up to 60,000 tires per day. Therefore there is a need to reduce the cycle time for the marking system as much as possible.

Figure 5:
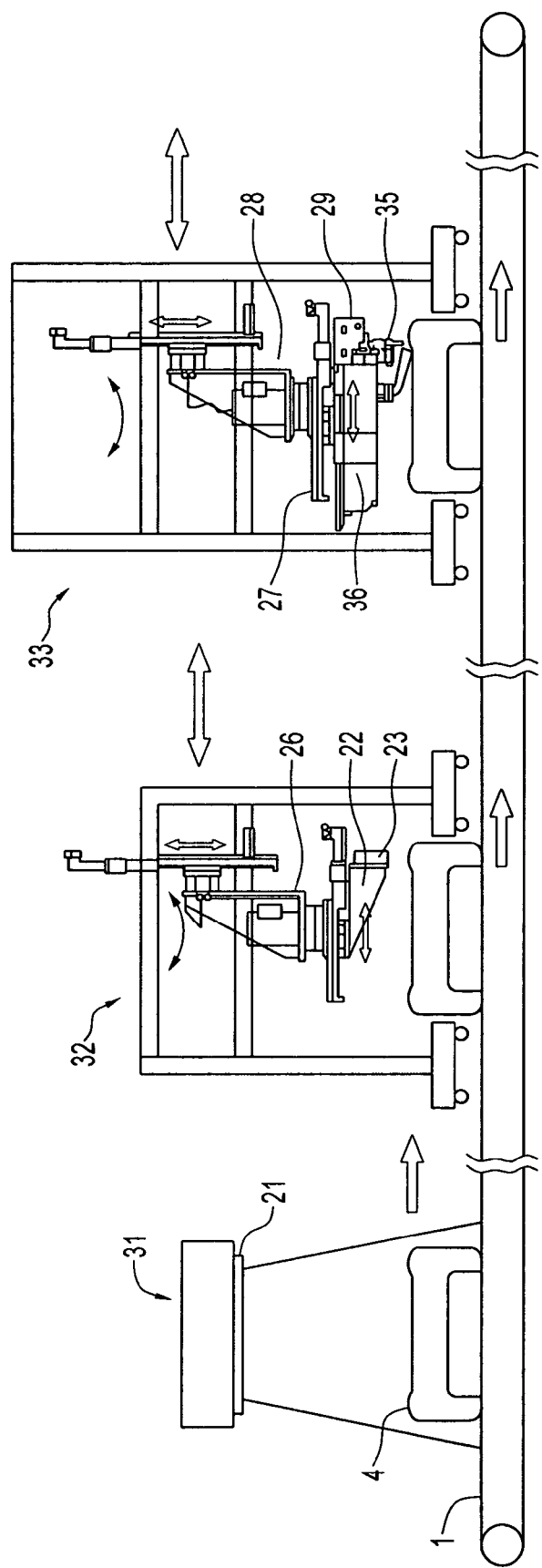
FIG. 5 illustrates a side view of a laser-based tire marking system in accordance with additional features of the present invention.

A system in accordance with the embodiments will now be described that can overcome the cycle time problem encountered with a single station system illustrated in FIG. 4. Referring to FIG. 5, a schematic of a multi-station system in accordance with another feature of the invention is shown. The tire 4 is continuously transported through the system without slip by the conveyer belt 1. At the first station 31 of the system there is a laser scanner 21, which detects the center position of the tire 4 on the belt 1. At the second station 32 there is a horizontal swivel arm 22 on which a first light sheet sensor enabled image processing system 23 is mounted.

During processing, at the second station 32 the rotational axis of the swivel arm 22 is placed collinear with the symmetry axis of the tire 4; therefore, the unit which suspends the swivel arm 22 is attached to an X, Y rail system 26. According to the information of the scanner 21, the X, Y system 26 is adjusted above the tire 4 and it follows the tire synchronously with the conveyer belt 1. By making at least one revolution of the swivel arm 22, the light sheet sensor enabled image processing system 23 measures the height profile of the raised symbols on the tire sidewall 24. The height profile data is then analyzed to find the marking spot on the tire.

At the third station, the marking laser 36 engraves a marking on the tires sidewall. The laser 36 can also be mounted on a second swivel arm 27. The rotational axis of this swivel arm 27 also has to be collinear with the tire's center. Therefore the unit is suspended at another X, Y rail system 28, and follows the conveyer belt 1 in the same way as swivel arm 27. The swivel arm 27 positions the laser 36 to the marking spot on the tire 4 according to the evaluation provided by the second station 32. The laser 36 can be a continuous wave C02 marking laser. The laser's 36 engraving can be accomplished by use of the computer-controlled galvanometer scanner 29. After the engraving, the marking is evaluated by a second light sheet sensor enabled image processing system 35, which can also be mounted on swivel arm 27.

The described system has two independent swivel arms. Therefore two tires can be processed at the same time. While the laser 36 mounted on swivel arm 27 is marking tire one, swivel arm 22 can synchronously analyze the sidewall of the following tire. Both processes need about 3 seconds and the transit time for the tire between the stations is also about 3 seconds. The cycle time of the system is therefore about 3 seconds, which can correspond to roughly 30,000 tires that can be processed per day using a multi-station system.

The laser station is preferably shielded by protective walls and has automatic doors, to confine any stray radiation or odorous fumes and vapors. This housing is not described here and only schematically shown in FIG. 4.

What is claimed:

1. A tire marking system, comprising:
   tire information stored in memory, said tire information including height profiles and sidewall templates;
   a first station located along a conveyor belt, the first station including a laser scanner for identifying the center position of a fire on the conveyor belt;
   a second station located along a conveyor belt after the first station, said second station including a first image processing system adapted with a light sheet sensor to measure the height profile of tire sidewalls, said image processing further adapted to identify the type and size of tires by comparison to the tire information and height profiles contained in the memory; and
   a third station located along a conveyor belt after the second station, the third station including a marking laser adapted for engraving markings on a specific spot in rubber on the side of a tire via laser radiation after the type and size of the tire and a marking spot has been identified by the first image processing system.

2. The system of claim 1, wherein said second station includes a swivel arm whereon the first image processing system is mounted said swivel arm adapted to swing forward and backward to enable at least one of tire identification by the image processing system or selection of a laser marking spot by the image processing system; and said third station includes a swivel arm whereon at least one of the marking laser or second image processing system is mounted, said swivel arm adapted to swing forward and backward to enable at least one of tire identification by the image processing system, selection of a laser marking spot by the image processing system, engraving a mark on a fire sidewall with the marking laser, or verification of engraving.

3. A tire marking system, comprising:
   a memory containing tire information including height profiles;
   at least one image processing system including a light sheet sensor adapted to measure the height profile of a tire sidewall by capturing an image profile of the tire including using said light sheet sensor to measure the height profile of the raised symbols formed on at least one sidewall of said tire, said image processing further adapted to identify the type and size of tires by comparison of said image profile to the tire information and height profiles contained in the memory;
   a marking laser adapted for engraving markings on a specific spot in rubber on the side of a tire via laser radiation after the type and size of the tire and a marking spot has been identified by the image processing.

4. The system of claim 3 further comprising a swivel arm whereon at least one of the image processing system including a light sheet sensor or marking laser is mounted, wherein the swivel arm which swings circularly across the tire sidewall during tire marking system operation.

5. The system of claim 3, wherein the tire information stored in the memory includes a library of taught-in reference profiles.

6. The system of claim 3, said system adapted to verify the marking quality by the marking laser using the at least one light sheet sensor enabled image processing system.

7. The system of claim 3 wherein the marking laser is a continuous wave C02-laser.

8. The system of claim 3, further comprising two stations located along a conveyor belt, a first station including a first image processing system including a light sheet sensor adapted to measure the height profile of the tire sidewall, said image processing further adapted to identify the type and size of tires by comparison to the tire information and height profiles contained in the memory, a second station including the marking laser adapted for engraving markings on a specific spot in rubber on the side of a tire via laser radiation after the type and size of the tire and a marking spot has been identified by the first image processing system including a light sheet sensor.

9. The system of claim 8, said second station further including a second image processing system including a light sheet, said second image processing adapted to verify the marking quality by the marking laser by comparing the marking to tire information stored in the memory.

10. The system of claim 9, said first station further comprising a first swivel arm whereon the image processing system including a light sheet sensor is mounted and the second station further comprises a second swivel arm whereon at least one of the marking laser or second image processing system including a light sheet sensor are mounted, wherein the first and second swivel arms which swings circularly across the tire sidewall during tire marking system operation.

11. The system of claim 10, wherein the tire information stored in the memory includes a library of taught-in reference profiles.

12. The system of claim 8, said first station further comprising a first swivel arm whereon the image processing system including a light sheet sensor is mounted and the second station further comprises a second swivel arm whereon the marking laser is mounted, wherein the first and second swivel arms which swings circularly across the tire sidewall during tire marking system operation.

13. A tire marking system, comprising:
tire information stored in memory, said tire information including height profiles of raised symbols located on the sidewalls of tires and sidewall templates;
a light sheet sensor enabled image processing system adapted to measure the height profile of raised symbols located on at least one sidewall of tire, said image processing further adapted to identify the type and size of tires by comparison of measured symbol height profile information to the tire information stored in the memory;
a marking laser adapted for engraving markings on a specific spot in rubber on tire sidewalk via laser radiation after the type and size of the tire and a marking spot has been identified by the image processing system; and
a swivel arm whereon at least one of the image processing system or marking laser are mounted, said swivel arm adapted to swing forward and backward to enable at least one of tire identification by the image processing system, selection of a laser marking spot by the image processing system, or engraving a mark on a tire sidewall with the marking laser.

14. The system of claim 13, wherein the tire information stored in the memory includes a library of taught-in reference profiles.

15. The system of claim 13, said system adapted to verify the marking quality by the marking laser using the at least one light sheet sensor enabled image processing system.

16. The system of claim 13 wherein the marking laser is a continuous wave C02-laser.

17. The system of claim 13, further comprising two stations located along a conveyor belt, a first station including a first image processing system including a light sheet sensor adapted to measure the height profile of the tire sidewall, said image processing further adapted to identify the type and size of tires by comparison to the tire information and height profiles contained in the memory, a second station including the marking laser adapted for engraving markings on a specific spot in rubber on the side of a tire via laser radiation after the type and size of the tire and a marking spot has been identified by the first image processing system including a light sheet sensor.

18. The system of claim 17, said second station further including a second image processing system including a light sheet, said second image processing adapted to verify the marking quality by the marking laser by comparing the marking to tire information stored in the memory.

19. The system of claim 18, said first station further comprising a first swivel arm whereon the image processing system including a light sheet sensor is mounted and the second station further comprises a second swivel arm whereon at least one of the marking laser or second image processing system including a light sheet sensor are mounted, wherein the first and second swivel arms which swings circularly across the tire sidewall during tire marking system operation.

20. The system of claim 17, said first station further comprising a first swivel arm whereon the image processing system including a light sheet sensor is mounted and the second station further comprises a second swivel arm whereon the marking laser is mounted, wherein the first and second swivel arms which swings circularly across the tire sidewall during tire marking system operation.

* * * * *